(12) United States Patent
Staudt (10) Patent No.: US 9,027,706 B2
(45) Date of Patent: May 12, 2015

(54) ENHANCED, LIGHTWEIGHT ACOUSTIC SCRIM BARRIER

(71) Applicant: Federal-Mogul Powertrain, Inc., Southfield, MI (US)

(72) Inventor: Eric K. Staudt, Reading, PA (US)

(73) Assignee: Federal-Mogul Powertrain, Inc., Southfield, MI (US)

( * ) Notice: Subject to any disclaimer, the term of this patent is extended or adjusted under 35 U.S.C. 154(b) by 122 days.

(21) Appl. No.: 13/764,443

(22) Filed: Feb. 11, 2013

(65) Prior Publication Data

US 2014/0224576 A1    Aug. 14, 2014

(51) Int. Cl.
| | |
|---|---|
| E04B 1/82 | (2006.01) |
| E04B 1/84 | (2006.01) |
| G10K 11/162 | (2006.01) |
| G10K 11/168 | (2006.01) |
| G10K 11/172 | (2006.01) |
| E04B 1/74 | (2006.01) |

(52) U.S. Cl.
CPC ............... *E04B 1/84* (2013.01); *G10K 11/162* (2013.01); *G10K 11/168* (2013.01); *G10K 11/172* (2013.01)

(58) Field of Classification Search
CPC ........ G10K 11/168; E04B 1/82; E04B 1/8409
USPC ................... 181/290, 293, 295, 30, 291, 288; 296/39.3
See application file for complete search history.

(56) References Cited

U.S. PATENT DOCUMENTS

| | | | | |
|---|---|---|---|---|
| 2,973,295 A | * | 2/1961 | Rodgers, Jr. | 428/160 |
| 4,093,482 A | * | 6/1978 | Ogata et al. | 156/210 |
| 4,170,674 A | * | 10/1979 | Matsuki | 428/90 |
| 4,213,516 A | * | 7/1980 | Sulewsky | 181/286 |
| 4,430,286 A | * | 2/1984 | Franz | 264/258 |
| 4,441,581 A | * | 4/1984 | Sommerhalder | 181/286 |
| 4,531,609 A | * | 7/1985 | Wolf et al. | 181/290 |
| 4,661,392 A | * | 4/1987 | Kapstad | 428/182 |
| 4,886,696 A | * | 12/1989 | Bainbridge | 428/184 |
| 5,011,743 A | | 4/1991 | Sheridan et al. | |
| 5,068,001 A | * | 11/1991 | Haussling | 156/222 |
| 5,134,014 A | * | 7/1992 | Zaima et al. | 428/186 |
| 5,800,905 A | | 9/1998 | Sheridan et al. | |
| 5,892,187 A | * | 4/1999 | Patrick | 181/286 |
| 5,939,212 A | * | 8/1999 | Ragland et al. | 428/594 |

(Continued)

FOREIGN PATENT DOCUMENTS

| | | |
|---|---|---|
| DE | 19902905 A1 * | 8/2000 |
| WO | 2005021884 A1 | 3/2005 |

OTHER PUBLICATIONS

International Search Report mailed Sep. 11, 2014 (PCT/US2014/014776).

*Primary Examiner* — Edgardo San Martin
(74) *Attorney, Agent, or Firm* — Robert L. Stearns; Dickinson Wright, PLLC (57) ABSTRACT

An enhanced, lightweight acoustic absorber is provided. The acoustic absorber is bounded by the at least one scrim layer without need for additional layers, such as melt-blown or nonwoven layers. The at least one scrim layer includes at least one non-planar, folded scrim layer bonded to itself or another scrim layer to form a plurality of air spaces between folded portions of the at least one scrim layer. The at least one scrim layer establishes a thickness of the acoustic absorber extending across opposite exposed sides of the acoustic absorber.

18 Claims, 6 Drawing Sheets

(56) References Cited

U.S. PATENT DOCUMENTS

| | | |
|---|---|---|
| 6,186,270 B1 * | 2/2001 | Roller et al. ............ 181/286 |
| 6,446,751 B1 * | 9/2002 | Ahuja et al. ............ 181/295 |
| 6,630,222 B1 | 10/2003 | Fay et al. |
| 7,011,181 B2 * | 3/2006 | Albin, Jr. ............ 181/290 |
| 7,033,963 B2 | 4/2006 | Felegi, Jr. et al. |
| 7,132,376 B2 | 11/2006 | Rashed |
| 7,541,085 B2 | 6/2009 | Burdon |
| 7,744,143 B2 | 6/2010 | Gladfelter et al. |
| 8,230,969 B2 * | 7/2012 | Frederick et al. ............ 181/293 |
| 2004/0180177 A1 * | 9/2004 | Ray et al. ............ 428/86 |
| 2005/0263345 A1 * | 12/2005 | Erickson et al. ............ 181/290 |
| 2005/0263346 A1 * | 12/2005 | Nishimura ............ 181/290 |
| 2006/0035058 A1 * | 2/2006 | Ogawa et al. ............ 428/131 |
| 2010/0168286 A1 | 7/2010 | Gladfelter et al. |
| 2011/0107700 A1 | 5/2011 | Keene |
| 2012/0155688 A1 * | 6/2012 | Wilson ............ 381/354 |
| 2013/0327705 A1 * | 12/2013 | Clark et al. ............ 210/508 |

* cited by examiner

ENHANCED, LIGHTWEIGHT ACOUSTIC SCRIM BARRIER

BACKGROUND OF THE INVENTION

1. Technical Field

This invention relates generally to acoustic absorbers, and more particularly to acoustic absorbers having air pockets formed by one or more scrim layers.

2. Related Art

In order to provide the desired sound absorption, the best performing nonwoven acoustic absorbers typically include fine fibers made from staple fibers or fine melt-blown fibers in combination with a scrim layer bonded thereover. Although these forms of acoustic absorbers can prove effective, they tend to be bulky, relatively heavy, and costly to produce, largely due to the extra fiber needed to absorb sound, or the heated die needed when cutting pieces from the melt-blown type absorbers.

SUMMARY OF THE INVENTION

In accordance with one aspect of the invention, an enhanced, lightweight acoustic absorber is provided. The absorber is formed entirely from at least one scrim layer without the additional layers, such as melt-blown or nonwoven layers. The at least one scrim layer includes at least one non-planar, folded scrim layer bonded to itself or another scrim layer to form a plurality of air spaces between folded portions of the at least one scrim layer. The at least one scrim layer establishes a thickness of the absorber extending across opposite exposed sides of the absorber.

In accordance with another aspect of the invention, the acoustic absorber includes a single scrim layer.

In accordance with another aspect of the invention, a lofty, fibrous material is disposed in at least some of the air spaces.

In accordance with another aspect of the invention, the at least one scrim layer extends over a serpentine path.

In accordance with another aspect of the invention, the air spaces are staggered in overlapping relation with one another, thereby enhancing the sound absorption of the absorber.

In accordance with another aspect of the invention, a plurality of the at least one scrim layer are bonded to one another.

In accordance with another aspect of the invention, a lofty, fibrous material is disposed in at least some of the air spaces.

In accordance with another aspect of the invention, at least one of the scrim layers is planar.

In accordance with another aspect of the invention, at least one non-planar, folded scrim layer is sandwiched between of a pair of planar scrim layers.

In accordance with another aspect of the invention, a method of constructing an enhanced, lightweight acoustic absorber is provided. The method includes folding at least one scrim layer and then bonding the at least one scrim layer to itself or another scrim layer to form a plurality of air spaces between folded portions of the at least one scrim layer.

In accordance with another aspect of the invention, the method further includes using a single scrim layer to construct the absorber without inclusion of additional layers of material.

In accordance with another aspect of the invention, the method further includes disposing a lofty, fibrous material in at least some of the air spaces.

In accordance with another aspect of the invention, the method further includes forming the air spaces in staggered, overlapping relation with one another.

In accordance with another aspect of the invention, the method further includes bonding a plurality of the scrim layers to one another without inclusion of additional layers of material.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
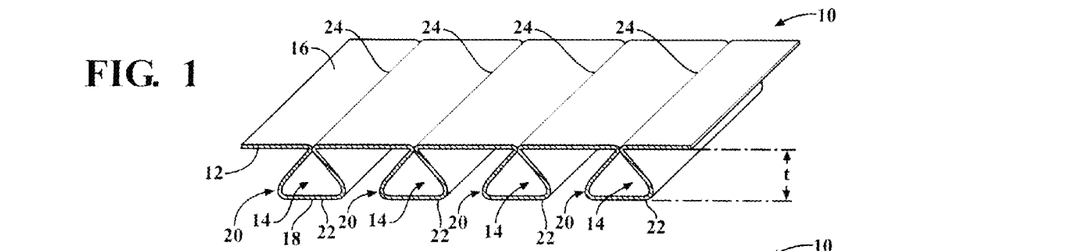
FIG. 1 is a perspective view of an acoustic absorber constructed in accordance with one aspect of the invention.

Referring in more detail to the drawings, FIG. 1 illustrates an enhanced, lightweight acoustic absorber, referred to hereafter as absorber 10, constructed in accordance with one aspect of the invention. The absorber 10, constructed in accordance with the invention, includes at least one non-planar, folded scrim layer bonded to itself or another scrim layer to form a plurality of air spaces between folded portions of the folded scrim layer. The scrim layer(s) discussed hereafter is/are constructed from materials exhibiting high tortuous paths for air to flow, such that air is substantially hindered from flowing directly through. Various materials and combinations thereof can be used to form the scrim layer(s), including cellulose materials and polymeric materials, either in whole or in part, and thus, it should be recognized that a scrim layer of cellulose material can include a weldable additive therein. Otherwise, the cellulose scrim layer can be 100% cellulose. Any thermoplastic fiber scrim could be used (PET, PP, PE, PA, PLA, PHA, PEEK, etc.) and in any combination. Any thermo-set or mineral scrim can also be used if heat resistance is needed (Para-Aramid, Meta-Aramid, Polyimide, Basalt, etc.). The only difference with a thermoset type scrim would be the way the scrim in welded or adhered. Even scrims including nanofibers may be used in this design. The absorber 10 of FIG. 1 is bounded in its entirety by a single folded scrim layer 12 to establish a thickness (t) of the absorber 10 extending across opposite exposed sides 16, 18 of the absorber 10. As such, with the absorber 10 being constructed in its entirety from the single scrim layer 12, the cost associated with the materials and construction of the absorber 10 is kept to a minimum, and so too is the weight of the absorber 10. Though very lightweight, the absorber 10 is highly effective in absorbing sound waves across a wide frequency spectrum from relatively low frequencies to relatively high frequencies, due in large part to a plurality of air spaces 14 formed between the folded portions of the scrim layer 12.

The absorber 10 has a single scrim layer 12 forming its entire outer envelope. Accordingly, the absorber 10 does not include any additional layers, thereby lending to its being lightweight and low cost. The scrim layer 12 is folded upon itself to form the enclosed air spaces 14. The air spaces 14 are formed between adjacent folded portions 20 of the scrim layer 12. The folded portions 20 extend laterally away from one side 16 to the opposite side 18, wherein a free end 22 of each folded portion 20 defines the opposite side 18. The side 16 is formed as a planar surface, with the folded portions 20 being bonded along a weld seam or otherwise bonded seam 24 extending therealong. As shown, by way of example and without limitation, the folded portions 20 are generally triangular in cross-section, with an apex of the triangular-shaped folded portions 20 being fixed via the bonded seam 24. The welded or bonded seam 24 can be formed via any suitable process, including, but not limited to, ultrasonic welding, laser welding, spot welding, or other suitable types of welding processes, or via any suitable adhesive. Accordingly, the air spaces 14 are fixed against becoming unfolded. This allows for the absorber 10 to keep its thickness and "springback" when positioned inside compressed areas within the application.

Figure 1A:
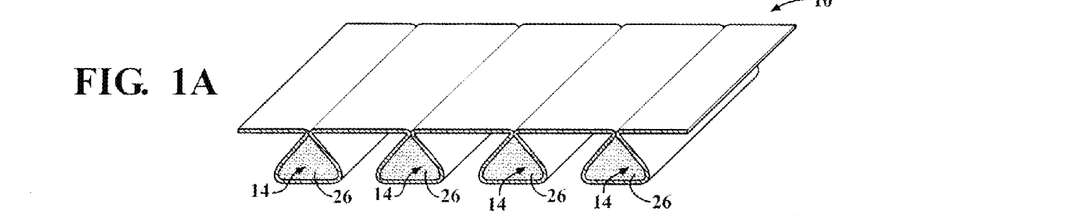
FIG. 1A is a perspective view of an acoustic absorber constructed in accordance with another of the invention.

In accordance with another aspect of the invention, as shown in FIG. 1A, wherein the same reference numerals are used to identify like features as described in FIG. 1, at least some of the air spaces 14 of the absorber 10 can be filled with a fibrous material 26 to further enhance the absorption of sound waves and further enhance the insulative properties of the absorber 10. Of course, it should be recognized that the air spaces 14 can remain open and unfilled, as shown in FIG. 1, if desired for the intended application. If filled, the fibrous material 26 can be provided from any suitable fibrous material, including "Asian cardboard", which has constituents of very short, very fine fibers having a length less than 0.2 mm (referred to as "fines") from low quality previously recycled pine cardboard, bamboo fibers, jute fibers, rice fibers, and/or other scrap/waste materials. As such, as a result of the very fine fibers contained within Asian cardboard, attempts to recycle Asian cardboard is often met with failure, with the very fine constituents of the Asian cardboard being flushed through the screens or mesh used to carry pulp recycling process into the environment via the resulting waste stream of the recycling process. Accordingly, Asian cardboard is typically considered to be a low grade, non-recyclable waste due to its being constructed from inferior constituent ingredients. In addition to Asian cardboard, the fibrous material 26 can be provided from any suitable recycled material, including recycled textiles, foam-based materials, standard cardboard, rags, gloves, or the like. Accordingly, in addition to providing a highly effective, lightweight, economical acoustic absorber, a continued use is provided for materials that might otherwise be sent to landfills.

Figure 2:
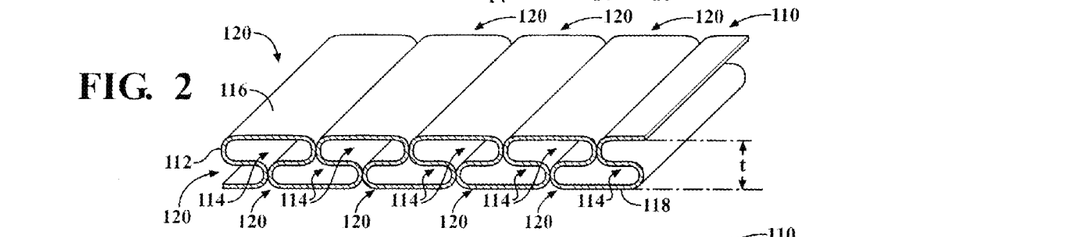
FIG. 2 is a perspective view of an acoustic absorber constructed in accordance with another of the invention.

In FIG. 2, an absorber 110 constructed in accordance with another aspect of the invention is shown, wherein the same reference numerals, offset by a factor of 100, are used to identify like features discussed above. The absorber 110, like the absorber 10, is constructed from a single scrim layer 112. The notable difference of the absorber 110 is with the formation of folded portions 120. The folded portions 120 are formed such that the scrim layer 112 meanders in serpentine fashion, back-and-forth along the length of the absorber 110. As such, air spaces 114 are formed in overlying, staggered relation with one another, wherein one set of air spaces 114 is formed adjacent one side 116, while another set of air spaces 114 is formed adjacent the opposite side 118. Accordingly, with the air spaces 114 being formed in over and underlying relation with one another, a thickness t of the absorber 110 extends across 2 layers of air spaces 114, thereby enhancing the sound absorbing properties of the absorber 110. In order for sound to pass through the absorber 110, the sound must pass through the two sets of air spaces 114 and also though three effective folded layers of the scrim layer 112.

Figure 2A:
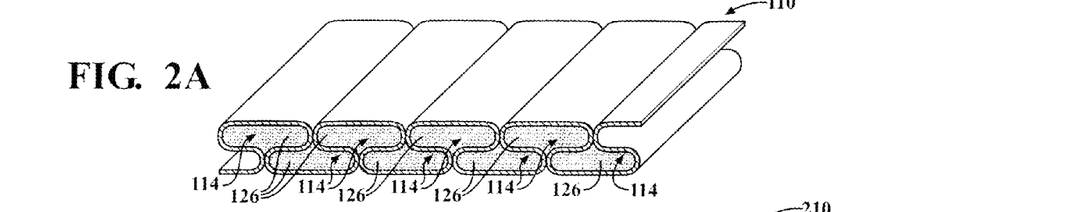
FIG. 2A is a perspective view of an acoustic absorber constructed in accordance with another of the invention.

In accordance with another aspect of the invention, as shown in FIG. 2A, wherein the same reference numerals are used to identify like features as described in FIG. 2, at least some of the air spaces 114 of the absorber 110 can be filled with a fibrous material 126 to further enhance the absorption of sound waves and further enhance the insulative properties of the absorber 110. Of course, it should be recognized that all or some of the air spaces 114 can remain open and unfilled, as shown in FIG. 2, if desired for the intended application. The filling is provided from fibrous material as described above with regard to FIG. 1A, and thus, the fibrous filling material is not discussed further.

Figure 3:
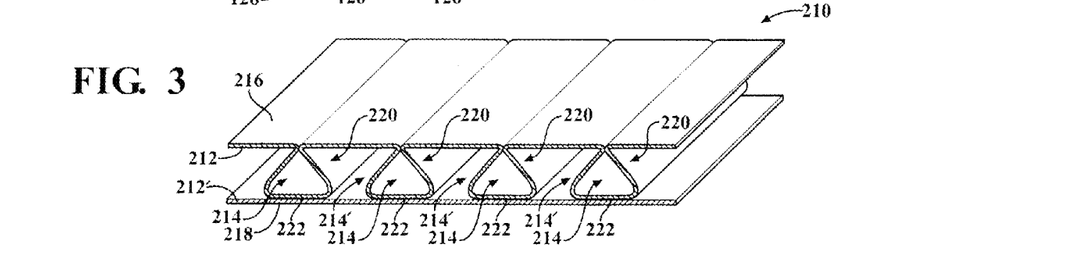
FIG. 3 is a perspective view of an acoustic absorber constructed in accordance with another of the invention.

In FIG. 3, an absorber 210 constructed in accordance with another aspect of the invention is shown, wherein the same reference numerals, offset by a factor of 200, are used to identify like features discussed above. The absorber 210 includes a first scrim layer 212 that is constructed similar to the scrim layer 12 of FIGS. 1 and 1A. In addition, another scrim layer 212' is bonded to free ends 222 of the individual folded portions 220 to form a planar side 218 spaced from an opposite planar side 216. As such, the folded portions 220 and air spaces 214 formed thereby are contained between the opposite sides 216, 218, thereby forming additional air spaces 214' between adjacent folded portions 220 and an additional absorber of sound, and further facilitating maintaining the absorber 210 as a self-supporting, semi-rigid structure.

Figure 3A:
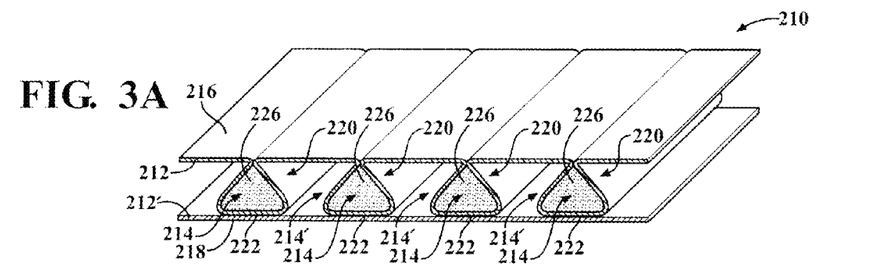
FIG. 3A is a perspective view of an acoustic absorber constructed in accordance with another of the invention.

In accordance with another aspect of the invention, as shown in FIG. 3A, wherein the same reference numerals are used to identify like features as described in FIG. 3, at least some of the air spaces 214 formed inside the folded portions 220 can be filled with a fibrous material 226 to further enhance the absorption of sound waves and further enhance the insulative properties of the absorber 210. Of course, it should be recognized that all or some of the air spaces 214 can remain open and unfilled, as shown in FIG. 3, if desired for the intended application. The filling is provided from fibrous material as described above with regard to FIG. 1A, and thus, the fibrous filling material is not discussed further.

Figure 3B:
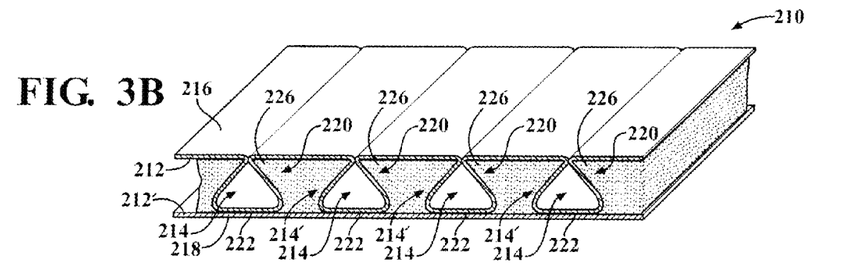
FIG. 3B is a perspective view of an acoustic absorber constructed in accordance with another of the invention.

In accordance with another aspect of the invention, as shown in FIG. 3B, wherein the same reference numerals are used to identify like features as described in FIG. 3, at least some of the air spaces 214' formed between the folded portions 220 can be filled with a fibrous material 226 to further enhance the absorption of sound waves and further enhance the insulative properties of the absorber 210. Of course, it should be recognized that all or some of the air spaces 214' can remain open and unfilled, as shown in FIG. 3, if desired for the intended application. The filling is provided from fibrous material as described above with regard to FIG. 1A, and thus, the fibrous filling material is not discussed further.

Figure 3C:
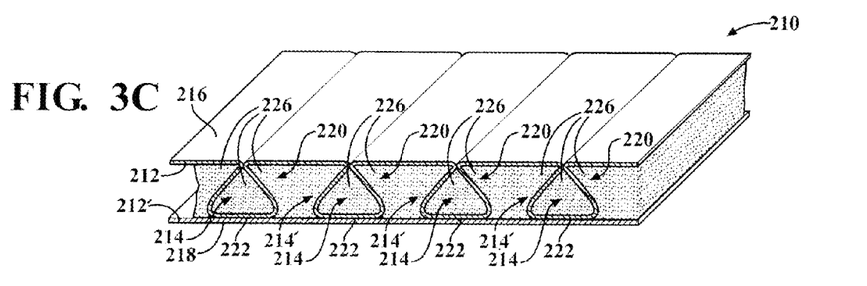
FIG. 3C is a perspective view of an acoustic absorber constructed in accordance with another of the invention.

In accordance with another aspect of the invention, as shown in FIG. 3C, wherein the same reference numerals are used to identify like features as described in FIG. 3, at least some of the air spaces 214 formed inside the folded portions 220 and at least some of the air spaces 214' formed between the folded portions 220 can be filled with a fibrous material 226 to further yet enhance the absorption of sound waves and further enhance the insulative properties of the absorber 210. As such, the entire or substantially entire space between the opposite sides 216, 218 can be filled with sound absorbing fibrous material. Of course, it should be recognized that at least some of the air spaces 214, 214' can remain open and unfilled, if desired for the intended application. The filling is provided from fibrous material as described above with regard to FIG. 1A, and thus, the fibrous filling material is not discussed further.

Figure 4:
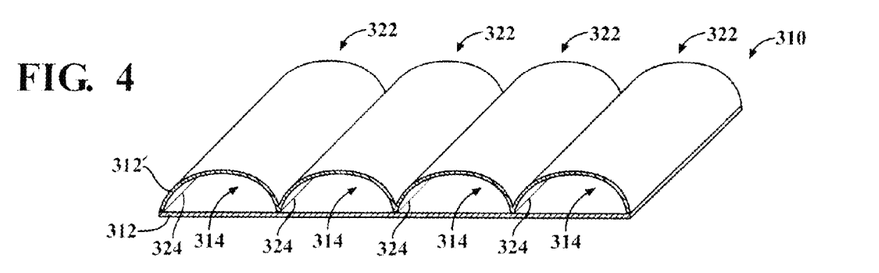
FIG. 4 is a perspective view of an acoustic absorber constructed in accordance with another of the invention.

In FIG. 4, an absorber 310 constructed in accordance with another aspect of the invention is shown, wherein the same reference numerals, offset by a factor of 300, are used to identify like features discussed above. The absorber 310 is constructed from a plurality of scrim layers, shown as pair of scrim layers 312, 312' bonded to one another. One of the scrim layers 312 remains planar or substantially planar, while the other scrim layer 312' is folded to undulate along the opposite scrim layer 312. As such, the undulating scrim layer 312' forms a plurality of individual air spaces 314 along the absorber 310. The individual air spaces 314 are separate from one another, thereby forming discrete and wholly separate air spaces 314. The undulating layer 312' is shown having folded semi-circular wall segments 322, with a bonded seam 324 extending between adjacent semi-circular wall segments 322. As such, the air spaces 314 occupy semicircular areas.

Figure 4A:
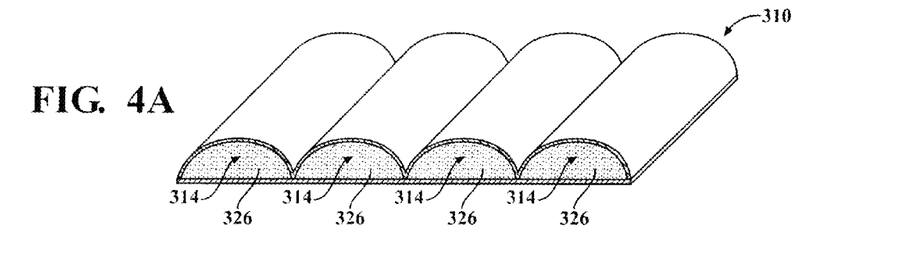
FIG. 4A is a perspective view of an acoustic absorber constructed in accordance with another of the invention.

In accordance with another aspect of the invention, as shown in FIG. 4A, wherein the same reference numerals are used to identify like features as described in FIG. 4, at least some of the semicircular air spaces 314 formed between the scrim layers 312, 312' can be filled with a fibrous material 326 to further enhance the absorption of sound waves and further enhance the insulative properties of the absorber 310. Of course, it should be recognized that all or some of the air spaces 314 can remain open and unfilled, as shown in FIG. 4, if desired for the intended application. The filling is provided from fibrous material as described above with regard to FIG. 1A, and thus, the fibrous filling material is not discussed further.

Figure 5:
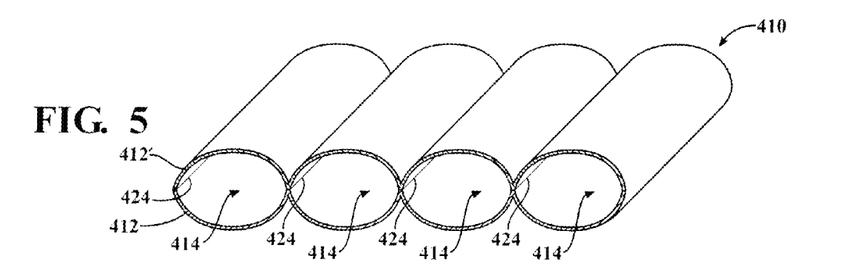
FIG. 5 is a perspective view of an acoustic absorber constructed in accordance with another of the invention.

In FIG. 5, an absorber 410 constructed in accordance with another aspect of the invention is shown, wherein the same reference numerals, offset by a factor of 400, are used to identify like features discussed above. The absorber 410, like the absorber 310, is formed from a pair of overlying scrim layers 412, 412', however, rather than one of the scrim layers remaining planar, the scrim layers 412, 412' undulate in mirrored relation with one another. As such, air spaces 414 formed between adjacent bonded seams 424 are formed as being generally circular to oval in form.

Figure 5A:
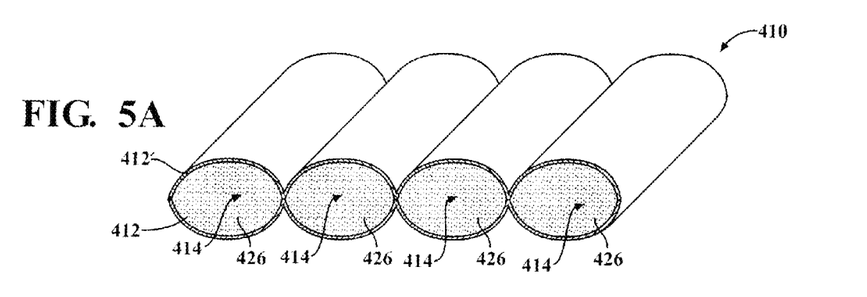
FIG. 5A is a perspective view of an acoustic absorber constructed in accordance with another of the invention.

In accordance with another aspect of the invention, as shown in FIG. 5A, wherein the same reference numerals are used to identify like features as described in FIG. 5, at least some of the circular or oval air spaces 414 formed between the scrim layers 412, 412' can be filled with a fibrous material 426 to further enhance the absorption of sound waves and further enhance the insulative properties of the absorber 410. Of course, it should be recognized that all or some of the air spaces 414 can remain open and unfilled, as shown in FIG. 5, if desired for the intended application. The filling is provided from fibrous material as described above with regard to FIG. 1A, and thus, the fibrous filling material is not discussed further.

Figure 6:
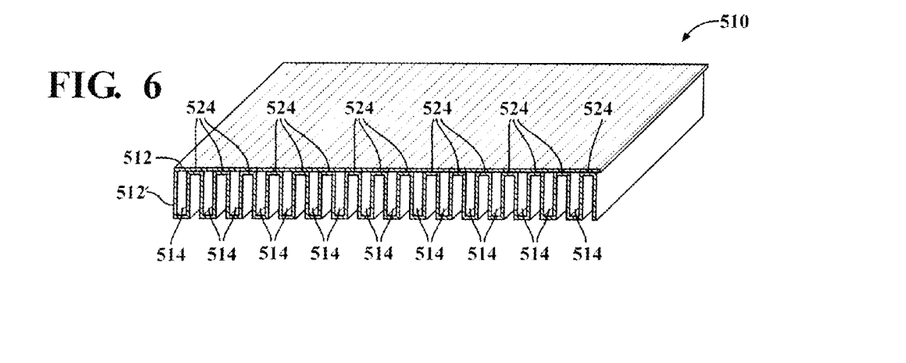
FIG. 6 is a perspective view of an acoustic absorber constructed in accordance with another of the invention.

In FIG. 6, an absorber 510 constructed in accordance with another aspect of the invention is shown, wherein the same reference numerals, offset by a factor of 500, are used to identify like features discussed above. The absorber 510 is formed from a pair of overlying scrim layers 512, 512', wherein one of the scrim layers 512 remains planar or substantially planar, while the other scrim layer 512' undulates along the scrim layer 512 and is bonded thereto. Rather than undulating to form semicircular air spaces, as shown in FIG. 4, the scrim layer 512' is folded in an accordion fashion to form generally square or rectangular shaped waves. As such, generally square or rectangular air spaces 514 are formed in spaced relation from one another between the scrim layers 512, 512'. Each air space 514 is formed by bonding the scrim layers 512, 512' together along bonded seams 524 extending between adjacent air spaces 514.

Figure 6A:
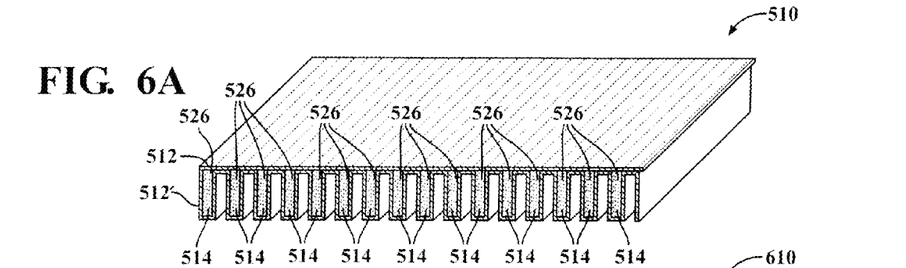
FIG. 6A is a perspective view of an acoustic absorber constructed in accordance with another of the invention.

In accordance with another aspect of the invention, as shown in FIG. 6A, wherein the same reference numerals are used to identify like features as described in FIG. 6, at least some of the square or rectangular air spaces 514 formed between the scrim layers 512, 512' can be filled with a fibrous material 526 to further enhance the absorption of sound waves and further enhance the insulative properties of the absorber 510. Of course, it should be recognized that all or some of the air spaces 514 can remain open and unfilled, as shown in FIG. 6, if desired for the intended application. The filling is provided from fibrous material as described above with regard to FIG. 1A, and thus, the fibrous filling material is not discussed further.

Figure 7:
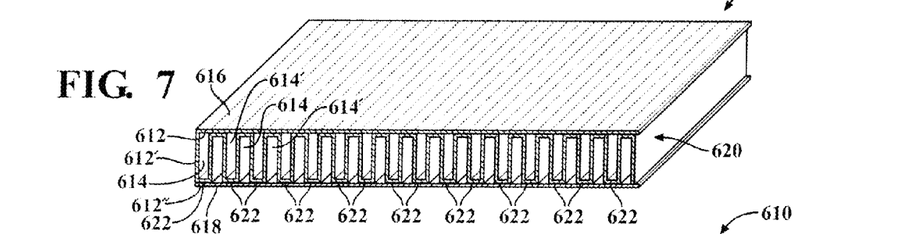
FIG. 7 is a perspective view of an acoustic absorber constructed in accordance with another of the invention.

In FIG. 7, an absorber 610 constructed in accordance with another aspect of the invention is shown, wherein the same reference numerals, offset by a factor of 600, are used to identify like features discussed above. The absorber 610 includes a pair of scrim layers 612, 612' formed similar to the scrim layers 612, 612' of FIGS. 6 and 6A. In addition, a third scrim layer 612" is bonded to free ends 622 of the individual folded portions 620 to form a planar side 618 spaced from an opposite planar side 616. As such, the folded portions 620 and air spaces 614 formed thereby are contained between the opposite sides 616, 618, thereby forming additional air spaces 614' between adjacent folded portions 620 and an additional absorber of sound, and further facilitating maintaining the absorber 610 as a self-supporting, semi-rigid structure. Accordingly, the entire space between the bonded scrim layers 612, 612' is occupied by the enclosed air spaces 614, 614', thereby enhancing the acoustic absorbtion properties.

Figure 7A:
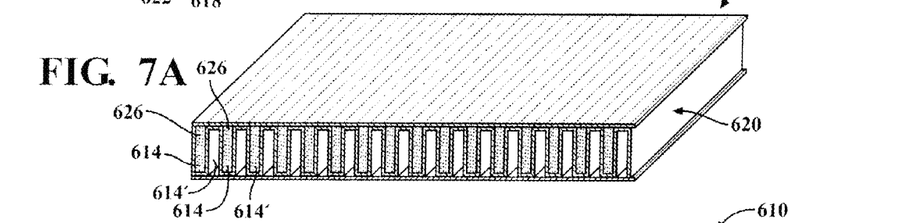
FIG. 7A is a perspective view of an acoustic absorber constructed in accordance with another of the invention.

In accordance with another aspect of the invention, as shown in FIG. 7A, wherein the same reference numerals are used to identify like features as described in FIG. 7, at least some of the air spaces 614 formed inside the folded portions 620 can be filled with a fibrous material 626 to further enhance the absorption of sound waves and further enhance the insulative properties of the absorber 610. Of course, it should be recognized that all or some of the air spaces 614 can remain open and unfilled, as shown in FIG. 7, if desired for the intended application. The filling is provided from fibrous material as described above with regard to FIG. 1A, and thus, the fibrous filling material is not discussed further.

Figure 7B:
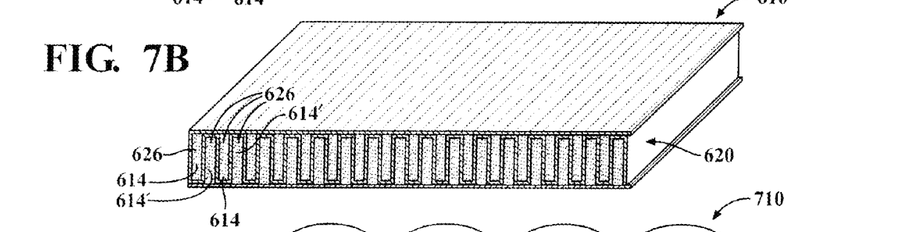
FIG. 7B is a perspective view of an acoustic absorber constructed in accordance with another of the invention.

In accordance with another aspect of the invention, as shown in FIG. 7B, wherein the same reference numerals are used to identify like features as described in FIG. 7, at least some of the air spaces 614 formed inside the folded portions 620 and at least some of the air spaces 614' formed between the folded portions 620 can be filled with a fibrous material 626 to further yet enhance the absorption of sound waves and further enhance the insulative properties of the absorber 610. As such, the entire or substantially entire space between the opposite sides 616, 618 can be filled with sound absorbing fibrous material. Of course, it should be recognized that at least some of the air spaces 614, 614' can remain open and unfilled, if desired for the intended application. The filling is provided from fibrous material as described above with regard to FIG. 1A, and thus, the fibrous filling material is not discussed further.

Figure 8:
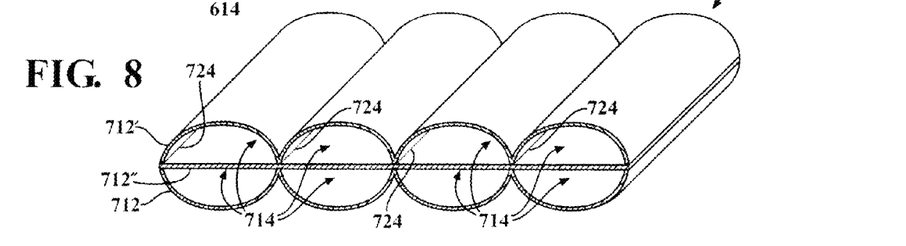
FIG. 8 is a perspective view of an acoustic absorber constructed in accordance with another of the invention.

In FIG. 8, an absorber 710 constructed in accordance with another aspect of the invention is shown, wherein the same reference numerals, offset by a factor of 700, are used to identify like features discussed above. The absorber 710 is similar to the absorber 410, however, rather than having only the scrim layers 712, 712' undulating in mirrored relation with one another, another scrim layer 712" extends in planar fashion between the mirrored undulating scrim layers 712, 712'. As such, generally semicircular air spaces 714 are formed in mirrored relation with one another between the centrally extending scrim layer 712" and the opposite scrim layers 712, 712'. It should be recognized that the bonded seams 724 extend through each of the scrim layers 712, 712', 712" to bond the individual scrim layers 712, 712', 712" to one another.

Figure 8A:
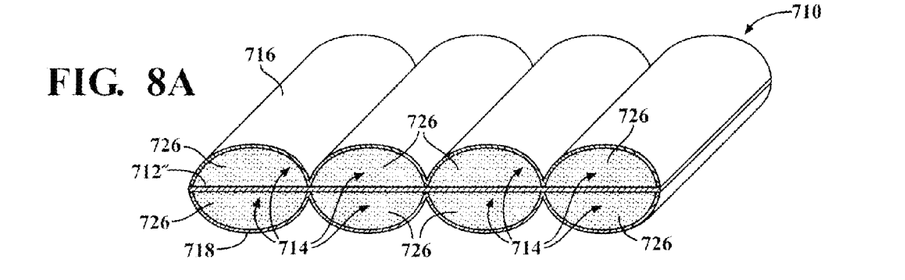
FIG. 8A is a perspective view of an acoustic absorber constructed in accordance with another of the invention.

In accordance with another aspect of the invention, as shown in FIG. 8A, wherein the same reference numerals are used to identify like features as described in FIG. 8, at least some of the air spaces 714 formed on opposite sides of the central scrim layer 712" can be filled with a fibrous material 726 to further yet enhance the absorption of sound waves and further enhance the insulative properties of the absorber 710. As such, the entire or substantially entire space between the opposite sides 716, 718 can be filled with sound absorbing fibrous material. Of course, it should be recognized that at least some of the air spaces 714 can remain open and unfilled, if desired for the intended application. The filling is provided from fibrous material as described above with regard to FIG. 1A, and thus, the fibrous filling material is not discussed further.

Figure 9:
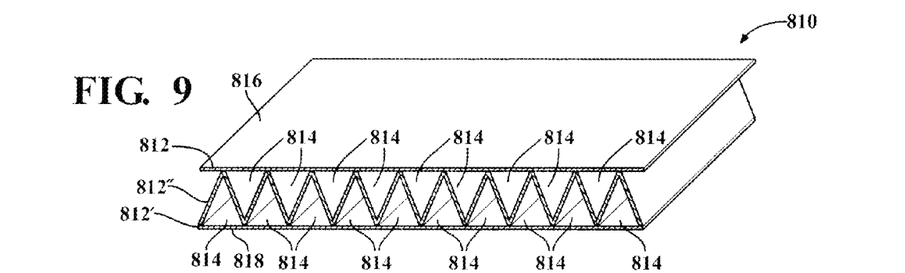
FIG. 9 is a perspective view of an acoustic absorber constructed in accordance with another of the invention.

In FIG. 9, an absorber 810 constructed in accordance with another aspect of the invention is shown, wherein the same reference numerals, offset by a factor of 800, are used to identify like features discussed above. The absorber 810 has a pair of planar scrim layers 812, 812' and a central folded scrim layer 812". The planar scrim layers 812, 812' form opposite sides 816, 818 of the absorber 810, while the folded central scrim layer 812" forms a plurality of air spaces 814 between the central scrim layer 812" and the scrim layers 812, 812'. The central scrim layer 812" is folded in accordion fashion, zigzagging back and forth between the opposite sides 816, 818.

Figure 9A:
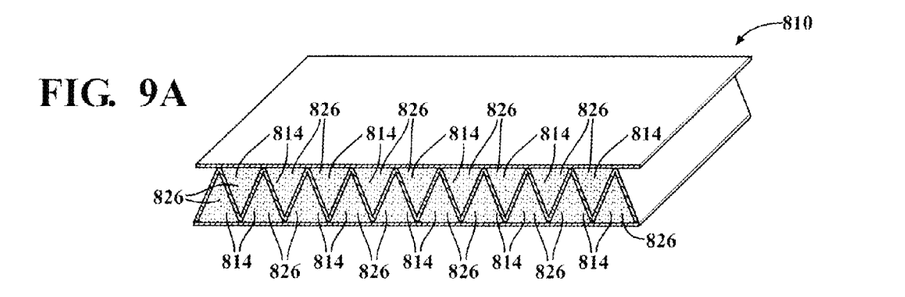
FIG. 9A is a perspective view of an acoustic absorber constructed in accordance with another of the invention.

In accordance with another aspect of the invention, as shown in FIG. 9A, wherein the same reference numerals are used to identify like features as described in FIG. 9, at least some of the air spaces 814 formed on opposite sides of the central scrim layer 812" can be filled with a fibrous material 826 to further yet enhance the absorption of sound waves and further enhance the insulative properties of the absorber 810. As such, the entire or substantially entire space between the opposite sides 816, 818 can be filled with sound absorbing fibrous material. Of course, it should be recognized that at least some of the air spaces 814 can remain open and unfilled, if desired for the intended application. The filling is provided from fibrous material as described above with regard to FIG. 1A, and thus, the fibrous filling material is not discussed further.

Figure 10:
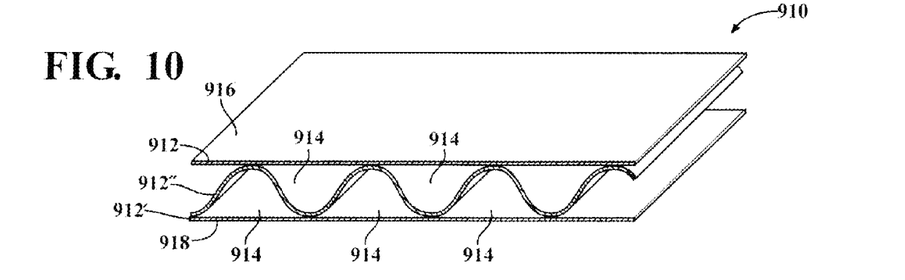
FIG. 10 is a perspective view of an acoustic absorber constructed in accordance with another of the invention.

In FIG. 10, an absorber 910 constructed in accordance with another aspect of the invention is shown, wherein the same reference numerals, offset by a factor of 900, are used to identify like features discussed above. The absorber 910, like the absorber 810, has a pair of planar scrim layers 912, 912' and a central folded scrim layer 912". However, unlike the central scrim layer 812" of the absorber 810, the central scrim layer 912" is folded in a smooth meandering serpentine fashion, thereby extending in a sinusoidal configuration back and forth between the opposite sides 916, 918 to form the plurality of air spaces 914 on opposite sides of the central scrim layer 912".

Figure 10A:
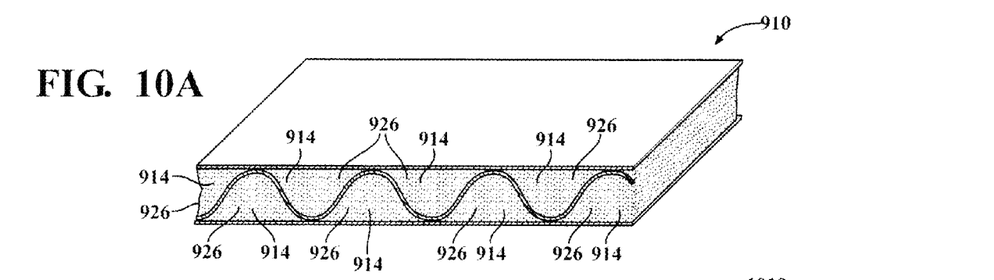
FIG. 10A is a perspective view of an acoustic absorber constructed in accordance with another of the invention.

In accordance with another aspect of the invention, as shown in FIG. 10A, wherein the same reference numerals are used to identify like features as described in FIG. 10, at least some of the air spaces 914 formed on opposite sides of the central scrim layer 912" can be filled with a fibrous material 926 to further yet enhance the absorption of sound waves and further enhance the insulative properties of the absorber 910. As such, the entire or substantially entire space between the opposite sides 916, 918 can be filled with sound absorbing fibrous material. Of course, it should be recognized that at least some of the air spaces 914 can remain open and unfilled, if desired for the intended application. The filling is provided from fibrous material as described above with regard to FIG. 1A, and thus, the fibrous filling material is not discussed further.

Figure 11:
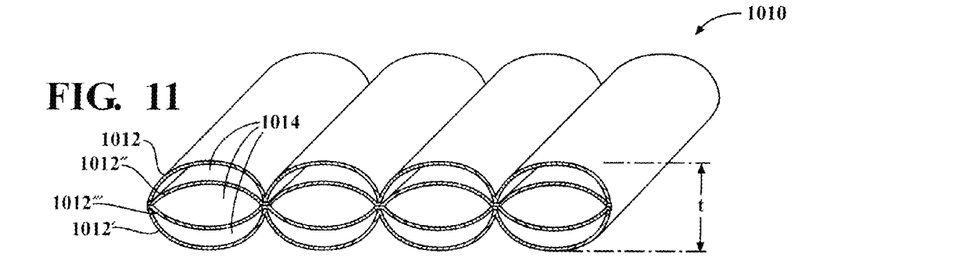
FIG. 11 is a perspective view of an acoustic absorber constructed in accordance with another of the invention.

In FIG. 11, an absorber 1010 constructed in accordance with another aspect of the invention is shown, wherein the same reference numerals, offset by a factor of 1000, are used to identify like features discussed above. The absorber 1010 is similar to the absorber 710, however, rather than having only a single central scrim layer extending between opposite outer scrim layers, the absorber 1010 includes a pair of central scrim layers 1012", 1012'" extending between outer undulating scrim layers 1012, 1012'. The outer scrim layers 1012, 1012' undulate in mirrored relation with one another, as do the central scrim layers 1012", 1012'". As such, the absorber 1010 has a series of three air spaces 1014 extending across its thickness t in stacked relation with one another, with bonded seams 1024 separating adjacent stacked air spaces 1014 from one another. It should be recognized that the bonded seams 1024 extend through each of the scrim layers 1012, 1012', 1012", 1012'" to bond the individual scrim layers 1012, 1012', 1012", 1012'" to one another.

Figure 11A:
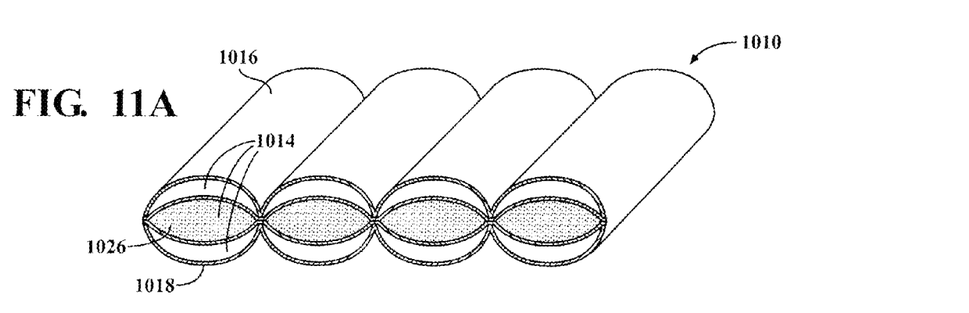
FIG. 11A is a perspective view of an acoustic absorber constructed in accordance with another of the invention.
Figure 11B:
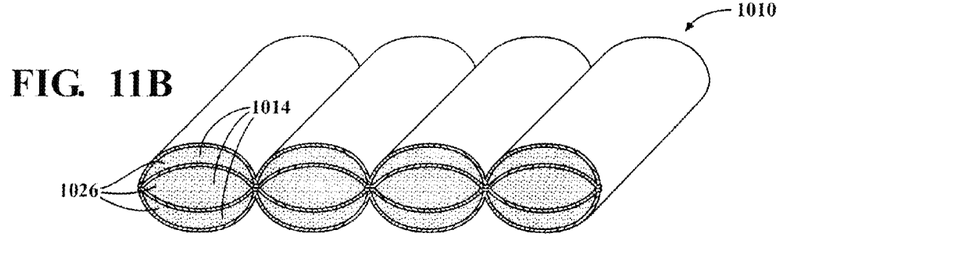
FIG. 11B is a perspective view of an acoustic absorber constructed in accordance with another of the invention.

In accordance with another aspect of the invention, as shown in FIG. 11A, wherein the same reference numerals are used to identify like features as described in FIG. 11, at least some of the air spaces 1014 can be filled with a fibrous material 1026 to further yet enhance the absorption of sound waves and further enhance the insulative properties of the absorber 1010. As such, the entire or substantially entire space between the opposite sides 1016, 1018 can be filled with sound absorbing fibrous material. For example, as shown in FIG. 11A, the central air spaces 1014 can be filled with fibrous material 1026, while the air spaces 1014 on opposite sides of the central air spaces 1014 can remain unfilled. Of course, it should be recognized, as shown in FIG. 11B, that all of the air spaces 1014 can be filled, if desired. The filling is provided from fibrous material as described above with regard to FIG. 1A, and thus, the fibrous filling material is not discussed further.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. An enhanced, lightweight acoustic absorber, comprising:
    at least one scrim layer, said at least one scrim layer including at least one non-planar, folded scrim layer bonded to itself to form a plurality of air spaces between folded portions of said at least one scrim layer.

2. The enhanced, lightweight acoustic absorber of claim 1 wherein said acoustic absorber includes only one of said at least one scrim layer.

3. The enhanced, lightweight acoustic absorber of claim 2 further including a lofty, fibrous material disposed in at least some of said air spaces.

4. The enhanced, lightweight acoustic absorber of claim 2 wherein said scrim layer extends over a serpentine path.

5. The enhanced, lightweight acoustic absorber of claim 2 wherein said air spaces are staggered in overlapping relation with one another.

6. The enhanced, lightweight acoustic absorber of claim 1 further including a plurality of said at least one scrim layer bonded to one another.

7. The enhanced, lightweight acoustic absorber of claim 6 wherein air spaces are formed between adjacent ones of said scrim layers.

8. The enhanced, lightweight acoustic absorber of claim 7 further including a lofty, fibrous material disposed in at least some of said air spaces with at least some of said air spaces remaining void.

9. The enhanced, lightweight acoustic absorber of claim 6 wherein at least one of said scrim layers is planar.

10. The enhanced, lightweight acoustic absorber of claim 6 wherein said at least one non-planar, folded scrim layer extends along a serpentine path.

11. The enhanced, lightweight acoustic absorber of claim 6 wherein said plurality of scrim layers includes a pair of scrim layers bonded to one another.

12. The enhanced, lightweight acoustic absorber of claim 11 wherein one of said scrim layers is planar.

13. A method of constructing an enhanced, lightweight acoustic absorber, comprising:
    folding at least one scrim layer; and
    bonding the at least one scrim layer to itself to form a plurality of air spaces between folded portions of the at least one scrim layer.

14. The method of claim 13 further including using a single scrim layer to construct the acoustic absorber without inclusion of additional layers of material.

15. The method of claim 14 further including disposing a lofty, fibrous material in at least some of the air spaces.

16. The method of claim 14 further including forming the air spaces in staggered, overlapping relation with one another.

17. The method of claim 13 further including bonding a plurality of the scrim layers to one another without inclusion of additional layers of material.

18. The method of claim 17 further including disposing a lofty, fibrous material in at least some of the air spaces while leaving at some of the air spaces void of material.

* * * * *